(12) United States Patent
Frye et al.

(10) Patent No.: US 9,228,824 B2
(45) Date of Patent: Jan. 5, 2016

(54) COMBINED SENSOR ARRAYS FOR RELIEF PRINT IMAGING

(71) Applicants: Fred Frye, Simpsonville, SC (US);
 Gerard R. Weimann, Chagrin Falls, OH (US)

(72) Inventors: Fred Frye, Simpsonville, SC (US);
 Gerard R. Weimann, Chagrin Falls, OH (US)

(73) Assignee: IB Korea Ltd. (KR)

( * ) Notice: Subject to any disclaimer, the term of this patent is extended or adjusted under 35 U.S.C. 154(b) by 23 days.

(21) Appl. No.: 13/891,788

(22) Filed: May 10, 2013

(65) Prior Publication Data

US 2014/0331875 A1 Nov. 13, 2014

(51) Int. Cl.
 *B41M 1/10* (2006.01)
 *G01B 9/02* (2006.01)
 *G06K 9/00* (2006.01)

(52) U.S. Cl.
 CPC ............... *G01B 9/02* (2013.01); *G06K 9/0004* (2013.01)

(58) Field of Classification Search
 CPC ............ G06K 9/0004; G06K 9/00026; G06K 9/00067; G01B 9/02
 USPC ....................... 382/124, 125; 396/15; 101/107
 See application file for complete search history.

(56) References Cited

U.S. PATENT DOCUMENTS

| | | | |
|---|---|---|---|
| 5,189,482 A | 2/1993 | Yang | |
| 5,650,842 A | 7/1997 | Maase | |
| 6,002,786 A | 12/1999 | Hallibert et al. | |
| 6,111,977 A | 8/2000 | Scott et al. | |
| 6,326,644 B1 | 12/2001 | Lee et al. | |
| 6,501,846 B1 * | 12/2002 | Dickinson et al. | ............ 382/124 |
| 6,688,186 B2 | 2/2004 | Chae | |
| 6,952,490 B2 | 10/2005 | Lee | |
| 6,993,164 B2 | 1/2006 | Jang | |
| 7,248,298 B2 | 7/2007 | Lee | |
| 7,929,031 B2 | 4/2011 | Nakayama | |

(Continued)

FOREIGN PATENT DOCUMENTS

| | | |
|---|---|---|
| CN | ZL02146245.3 | 6/2005 |
| CN | 101656299 A | 2/2010 |

(Continued)

OTHER PUBLICATIONS

Canaan S. Hong et al., "Single-Chip Camera Modules for Mosaic Image Sensor," Proceedings of Spie, vol. 4306, May 15, 2001, DOI: 10.1117/12.426959.

(Continued)

*Primary Examiner* — Matthew G Marini
(74) *Attorney, Agent, or Firm* — Brouse McDowell; Heather M. Barnes; Michael G. Craig

(57) ABSTRACT

One or more techniques and/or systems are disclosed for producing a relief print image. Two or more sensor arrays can be combined, and an electroluminescent layer can be deposited over the combined arrays. A resulting scanner component may be able to scan a larger area of a body part at the same time. The scanner may generate a relief print data sets indicative of light from the electroluminescent layer that are received by a first and second sensor array. The scanner can comprise the first and second sensor arrays coupled together, and the sensor arrays can be configured to convert received photons to an electrical signal. The scanner may also comprise the electroluminescent layer disposed on top of the coupled first and second sensor arrays. An image stitching component can stitch together the sets of relief print data, to create relief print image data indicative of a relief print image.

20 Claims, 9 Drawing Sheets

(56) References Cited

U.S. PATENT DOCUMENTS

| | | | |
|---|---|---|---|
| 2002/0018252 A1 | 2/2002 | Lee et al. | |
| 2003/0183019 A1 | 10/2003 | Chae | |
| 2004/0208347 A1* | 10/2004 | Baharav et al. | 382/124 |
| 2005/0100196 A1 | 5/2005 | Scott et al. | |
| 2005/0249386 A1* | 11/2005 | Juh | 382/124 |
| 2006/0159317 A1 | 7/2006 | Shyu et al. | |
| 2006/0269276 A1 | 11/2006 | O'Shea et al. | |
| 2007/0116331 A1 | 5/2007 | Rowe et al. | |
| 2007/0189588 A1 | 8/2007 | Kim et al. | |
| 2008/0260215 A1* | 10/2008 | Tien et al. | 382/124 |
| 2008/0273771 A1 | 11/2008 | Hsieh et al. | |
| 2008/0298650 A1 | 12/2008 | Jang et al. | |
| 2009/0259588 A1 | 10/2009 | Lindsay | |
| 2010/0142790 A1 | 6/2010 | Chang | |
| 2010/0284565 A1* | 11/2010 | Benkley et al. | 382/103 |
| 2012/0014569 A1 | 1/2012 | Frye et al. | |

FOREIGN PATENT DOCUMENTS

| | | |
|---|---|---|
| JP | 3544940 | 4/2004 |
| KR | 10-0285130 | 12/2000 |
| KR | 10-0290954 | 3/2001 |
| KR | 10-0290955 | 3/2001 |
| KR | 10-0302025 | 6/2001 |
| KR | 10-0302026 | 6/2001 |
| KR | 10-0305519 | 7/2001 |
| KR | 10-0309738 | 9/2001 |
| KR | 10-0324130 | 1/2002 |
| KR | 10-0343065 | 6/2002 |
| KR | 10-0345282 | 7/2002 |
| KR | 10-0345283 | 7/2002 |
| KR | 10-0348520 | 7/2002 |
| KR | 10-0349113 | 8/2002 |
| KR | 10-0349415 | 8/2002 |
| KR | 10-0350023 | 8/2002 |
| KR | 10-0378994 | 3/2003 |
| KR | 10-0380836 | 4/2003 |
| KR | 10-0436376 | 6/2004 |
| KR | 10-0439633 | 6/2004 |
| KR | 10-0460825 | 12/2004 |
| KR | 10-0465136 | 12/2004 |
| KR | 10-0466287 | 1/2005 |
| KR | 10-0467279 | 1/2005 |
| KR | 10-0560347 | 3/2006 |
| KR | 10-0879381 | 1/2009 |
| TW | 131132 | 9/2001 |
| TW | I228239 | 2/2005 |
| WO | 93/16441 A1 | 8/1993 |
| WO | 99/12472 A1 | 3/1999 |
| WO | 2005/067608 A2 | 7/2005 |

OTHER PUBLICATIONS

PCT International Search Report from International Application No. PCT/US2014/037456 mailed on Aug. 21, 2014.

PCT International Written Opinion of the International Searching Authority from International Application No. PCT/US2014/037456 mailed on Aug. 21, 2014.

\* cited by examiner

COMBINED SENSOR ARRAYS FOR RELIEF PRINT IMAGING

BACKGROUND

A body-part relief image scanning device (scanner), such as a fingerprint recognition device, is used for a variety of purposes including security. A person's body-part can contact a surface of the scanner, where an image may be captured of the body-part, such as a finger print. The resulting image may be compared to a database of body-part images to verify the person's identity, for example. It may be desirable, in some applications, for the contact surface of a scanner to be of sufficient dimension to obtain a larger image. Body-part relief print image devices, such as fingerprint recognition devices utilizing digital imaging sensors may have a limited area available to receive the body part. For example, technological, financial and practical considerations may prohibit the desired scanning area from being of sufficient size to receive an entire hand print (e.g., or two hand-prints). Some of these limitations are due to a limited size of available digital imaging sensors. That is, for example, as the size of a digital imaging sensor increases, the cost, complexity, potential manufacturing problems, processing power also increase, often making them infeasible for certain applications. For example, if a four finger sensor is desired, a single array that is large enough to accommodate the width and height of four fingers may be constructed. This type of larger digital imaging sensors typically requires increased computing ability in order to process received signals from indexed addresses (e.g., comprising pixels) into a resulting image. Often, larger sensors take longer to process an image, have a greater chance of error, and require advanced computing algorithms.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Accordingly, among other things, one or more techniques and/or systems are disclosed for combining two or more sensor arrays into a mosaic imaging array, and covering the mosaic imaging array with an electroluminescent film, for example, resulting in a imager with a larger relief print scanning area than traditional scanners.

In one implementation of a system for producing a relief print image, a relief print data generation component can be configured to generate a first set of relief print data and a second set of relief print data. In this implementation, the first set can comprise a first indication of light from an electroluminescent layer received by a first sensor array, and the second set can comprise a second indication of light from the electroluminescent layer received by a second sensor array. Further, the relief print data generation component can comprise the first sensor array, which can be configured to convert received photons to an electrical signal, operably coupled with the second sensor array, which may also be configured to convert received photons to an electrical signal.

The relief print data generation component can also comprise the electroluminescent layer, which may be disposed over a combination of the first sensor array and the second sensor array. Additionally, an image stitching component can be operably coupled with the relief print data generation component. Here, the image stitching component can be configured to stitch together the first set and the second set, resulting in a third set of data that may be indicative of a relief print image.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
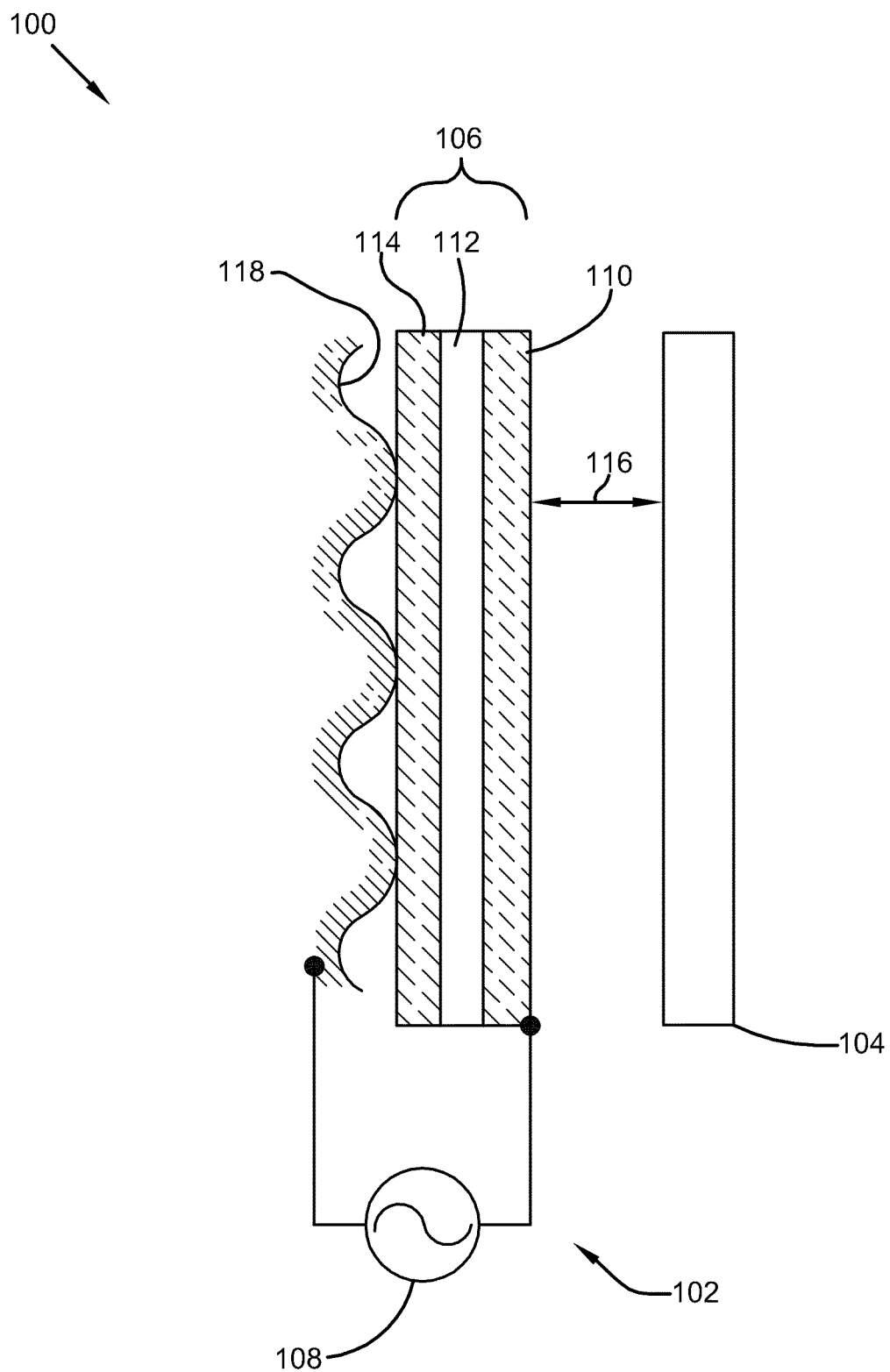
FIG. 1 is a component diagram illustrating an example body-part relief print recognition environment where one or more portions of one or more techniques and/or one or more systems described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a component diagram illustrating an example body-part relief print recognition environment 100 where one or more portions of one or more techniques and/or one or more systems described herein may be implemented. As shown in the example environment 100, an example body-part relief print recognition system, such as a fingerprint recognition system, may comprise a relief print generator 102. The example body-part relief print recognition system may further comprise a sensor arrangement 104. In one implementation, the sensor arrangement 104 may comprise image sensor that can convert an optical image into an electronic signal, for example, for digital processing of a captured optical image. As one example, the sensor arrangement 104 may comprise an active pixel sensor (APS), such as a thin film sensor (e.g., thin film photo-transistor, thin film photo-diode) or complementary metal-oxide semiconductor (CMOS). As another example, the sensor arrangement 104 may comprise a charge-coupled device (CCD), or some other imaging sensor that can convert photons into an electrical signal.

In one implementation, the relief print generator 102 may comprise an electrode-based (e.g., single electrode), electro-luminescence component 106, and/or an electrical connection 108 (e.g., a power source, such as an A/C source), which may provide an electrical connection between a relief object 118 and the electro-luminescence component 106. Further, in one implementation, the electrode-based, electro-luminescence component 106 may comprise a transparent electrode 110 (e.g., comprising an indium tin oxide (ITO) material, which may be attached to a polymer substrate), a luminescent layer 112, and/or a dielectric layer 114 (e.g., a conductive/insulating layer that allows current to pass). In one implementation, the relief print generator 102 and the sensor arrangement 104 may be separated at a distance 116 to each other or may be arranged such that the sensor arrangement 104 is in contact with the relief print generator 102. As one example, when a relief print recognition system is activated (e.g., by placing a finger at an image capture location), light produced by the luminescent layer 106 is emitted in respective directions, such as directed toward the sensor arrangement 104.

Figure 2A:
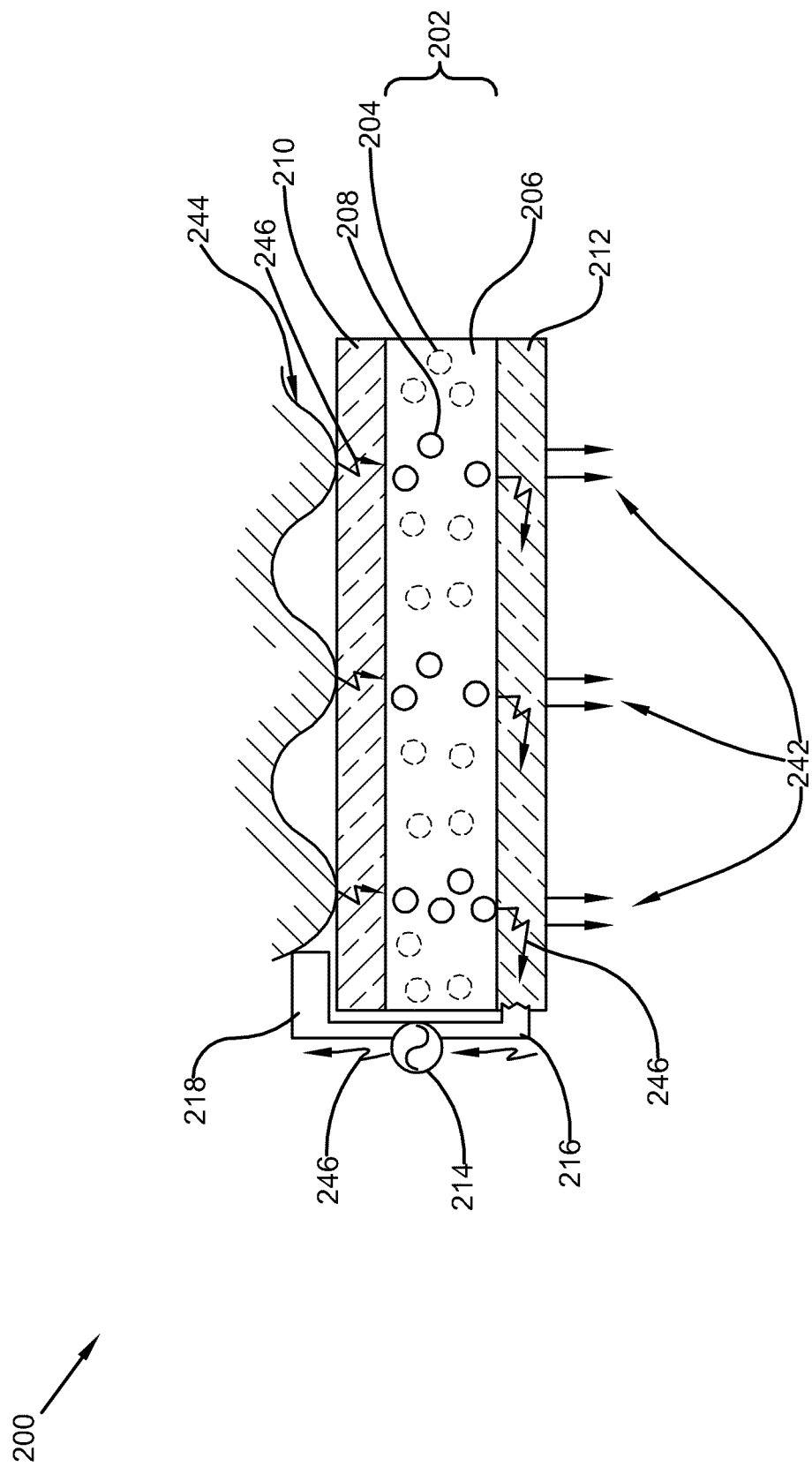
FIGS. 2A and 2B illustrate example implementations where one or more portions of one or more techniques described herein may be implemented.
Figure 2B:
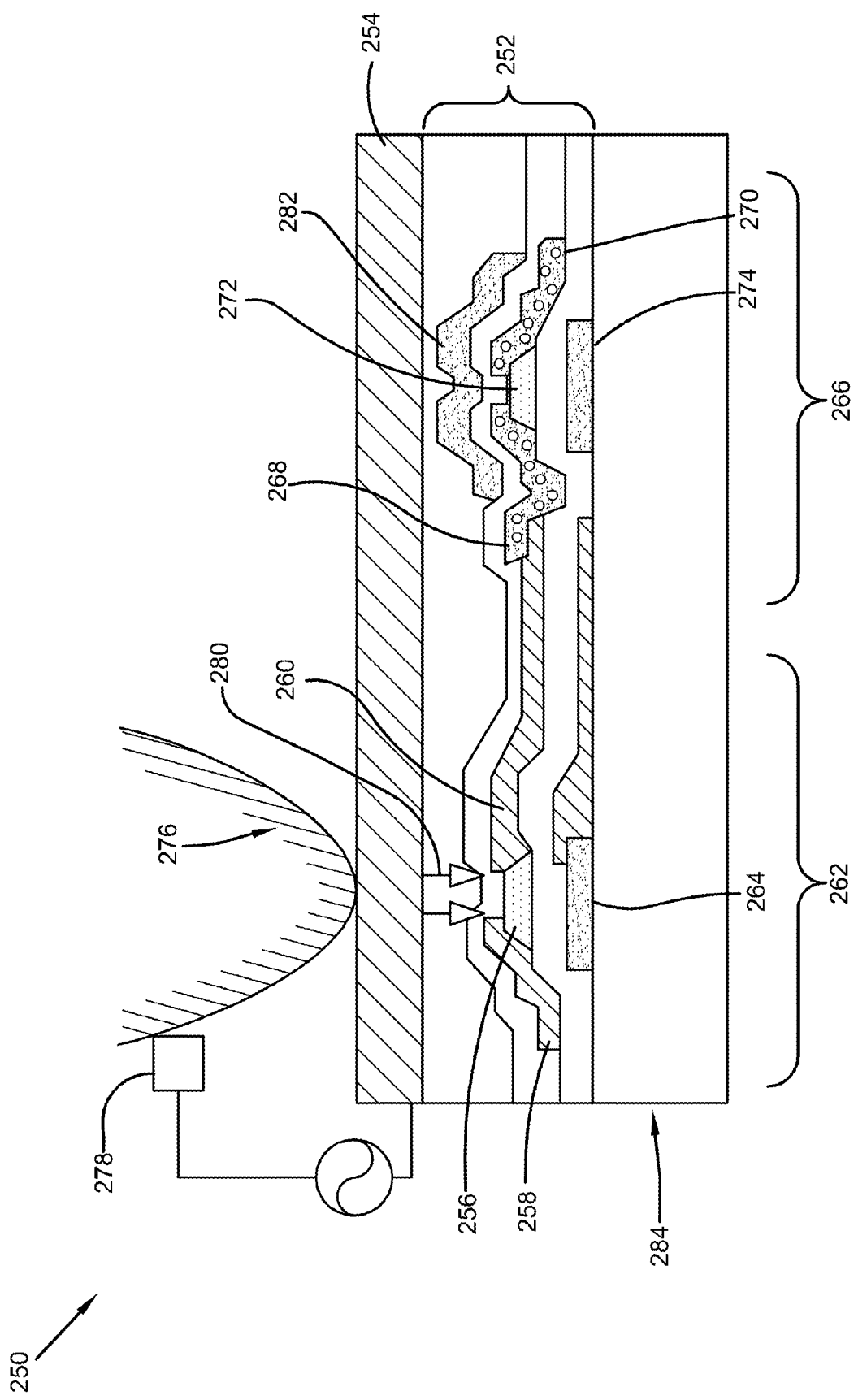

FIGS. 2A and 2B are component diagrams illustrating example implementations 200, 250 where one or more portions of one or more techniques and/or one or more systems described herein may be implemented. The example implementation 200 may comprise a portion of a luminescent element (e.g., 102 of FIG. 1) that can be utilized in a relief print scanner/sensor and the example implementation 250 may comprise a portion of a relief print scanner/sensor.

In FIG. 2A, an example implementation of a portion of a luminescent element 200 can comprise a light emitting layer 202, such as an electro-luminescence layer. In this implementation 200, the light emitting layer can be comprised of fluorescent particles 204 and a binder material 206. In one implementation, the electro-luminescent particles 204 may comprise activated particles 208, such as when subjected to an electrical current 246. Further, in this implementation, the activated particles 208 may emit photons 242, for example, thereby producing light when subjected to the electrical current 246.

In FIG. 2A, the example implementation of the portion of the luminescent element 200 can comprise a dielectric layer 210, and a transparent electrode 212. In this example implementation 200, the dielectric layer 210 is resident over the top portion of, and in contact with, the light emitting layer 202. The transparent electrode 212 is resident under the bottom portion of, and in contact with, the light emitting layer 202. Further, the example implementation of the portion of the luminescent element 200 can comprise a power source 214, such as an alternating current (AC) power source, having an electrode connection 216 in electrical connection with the transparent electrode 212, and a contact electrode 218 (e.g., an object contact electrode) residing substantially adjacent to, a contact surface (e.g., top surface) of the dielectric layer 210.

In one implementation, a relief object 244 may contact both the contact surface of the dielectric layer 210 and the contact electrode 218. In this implementation, for example, upon contacting both the dielectric layer 210 and the object contact electrode 218, an electrical circuit may be created between the contact electrode 218 and the transparent electrode 212, thereby allowing current 246 to flow between the two electrodes. Further, in this implementation, those portions of the relief object 244 (e.g., body-part relief ridges) that come in contact with the contact surface of the dielectric layer 210 can allow current 246 to pass from the contact electrode 218 to the dielectric layer 210. Additionally, the current 246 passing through the dielectric layer can activate the fluorescent particles 204 merely at the location of the contact. Upon activation, the activated particles 208 may emit photons 242 merely at the location of the contact of the portions of the relief object 244 (e.g., fingerprint ridges). In this way, for example, an illuminated relief print (e.g., fingerprint) of the relief object 244 (e.g., finger) may be produced when the relief object 244 contacts both the contact electrode 218 and the contact surface of the dielectric layer 210.

As shown in FIG. 2B, a relief print scanner can comprise an image sensor portion 252, that may be used to capture an optical image (e.g., an image of a fingerprint) by converting incoming photons into an electronic signal, for example, for later digital processing of the captured image. In one implementation, the image sensor portion 252 may comprise a thin film sensor array. For example, a thin film sensor-array may be used to detect photons emitted by a light emitting component 254 (e.g., the luminescent element 200 of FIG. 2A). Here, as an example, the image sensor portion 252 can detect light produced by the light emitting component 254 (e.g., produced in the form of a relief print) and produce an image using a photo-current, by converting the detected photons into an electrical signal.

In the example implementation 250, a photo-sensitive layer 256 (e.g., comprising SiH, amorphous silicon) may be formed between a first source electrode 258 and a first drain electrode 260 of a light sensing unit 262. When an electrical charge is applied to a first gate electrode 264, the photo-sensitive layer 256 becomes responsive to light, for example, where the photo-sensitive layer 256 may become electrically conductive when incident to photons of light. As one example, when light is incident on the photo-sensitive layer 256 over a predetermined, threshold light amount, the first source electrode 258 and the first drain electrode 260 may become electrically connected. Therefore, in this example, light generated from the light emitting component 254 (e.g., comprising a fingerprint pattern) may be received by the photo-sensitive layer 256, which may cause an electrical signal to pass from the first source electrode 258 to the first drain electrode 260 (e.g., providing an electronic signal indicative of the light received).

Further, a switching unit 266 of the image sensor portion 252 can comprise a second source electrode 268, a second drain electrode 270 and an intrinsic semiconductor layer 272. As one example, when a negative charge is applied to a second gate electrode 274, the intrinsic semiconductor layer 272 may become electrically conductive, thereby allowing the electrical signal created at the light sensing unit 262 to pass from the second source electrode to the second drain electrode (e.g., and to an electrical signal reading component for converting to a digital image). In this way, for example, the switching unit 266 may be used to control when an electrical signal indicative of a particular amount of light may be sent to an electrical signal reading component (e.g., for processing purposes and/or to mitigate signal interference with neighboring light sensing units).

Additionally, in this implementation 250, a light shielding layer 272 may be resident over the top portion of the switching unit 266. As one example, the light shielding layer 282 may mitigate intrusion of light to the intrinsic semiconductor layer 272, as light can affect the electrical conductivity of the intrinsic semiconductor layer 272. The image sensor portion 252 may also comprise a substrate 284 of any suitable material, onto which the layers of the image sensor portion 252 may be formed. As one example, when a relief object 276 (e.g., 244 of FIG. 2A) comes into contact with a contact electrode 278 and a contact surface (e.g., top surface) of the light emitting component 254, an electrical current may pass from the contact electrode 278, through the relief object 276, and into the light emitting component 254. In this example, the light emitting component 254 may emit photons 280 that are incident to the photo-sensitive layer 256, thereby allowing an electrical signal (e.g., indicative of the number of photons received) to pass from the first source electrode 258 to the second drain electrode 270, and to a signal reading component.

In one aspect, manufacturing efficiencies may be dependent upon a size of a sensor array produced from the manufacturing process. As an example, when producing a sensor array (e.g., chips), a large, circular wafer of silicon is typically used to produce a plurality of chips at the same time. For example, a single wafer can comprise many chips arranged in a grid pattern, depending on the size of the chip. That is, for example, a same sized silicon wafer may comprise fewer larger sized chips than smaller sized chips. Further, in this example, because the wafer is circular and the sensor arrays are typically square or rectangular (e.g., polygonal), a certain amount of wasted sensor array material is wasted at the edges of the wafer where complete sensor arrays may not be formed. Therefore, in this aspect, sensor arrays having a larger size, created on a same sized wafer, may result in more wasted material than smaller sized sensor arrays. In turn, this may result in a greater cost per square millimeter of sensor array manufactured, due to the greater amount of waste produced.

Additionally, in this aspect, during sensor array manufacture, a certain amount of manufacturing defects can occur on a wafer of sensor arrays. That is, for example, any given wafer of sensor arrays can comprise an expected number of defects, where the defect renders the sensor array ineffectual, and it is discarded as waste material. In this aspect, for example, a larger sensor array comprising a defect would represent a larger amount of waste material that is discarded, when compared to a smaller sensor array comprising a defect. Therefore, a wafer comprising smaller sensor arrays may result in less wasted material due to defects than a wafer comprising larger sensor arrays. As a result, for example, the cost per square millimeter may be less for smaller sensor arrays than for larger sensor arrays using a same wafer, comprising the same defects.

As a result, in this aspect, in order to improve manufacturing efficiencies, such as cost per square millimeter of sensor array produced, and/or a number or sensor arrays produced per wafer, a manufacturer may wish to utilize smaller wafer sizes in devices using sensor arrays. However, for example, a smaller sensor array may be limited to imaging merely small portions of a relief object. That is, as an example, while a large sensor array may be able to be used to capture large portions of a relief object (e.g., a hand print, or multiple fingers) at one time, the smaller sensor array may be limited to capturing small portions of the relief object (e.g., one finger); but, increasing a size of the sensor array can exponentially increase the cost of producing the sensor array. It should also be apparent that rather than using a large single array to accommodate a larger print relief area, for example, using a combination of smaller arrays to build larger sensing areas to accommodate large print relief images may provide for a higher quality and less expensive sensing system.

As provided herein, an apparatus may be devised that can produce a relief print image, which may be comprised of two or more sub-images that have been stitched together. An array of light sensors used to capture an image of a relief print may be effectively limited in size, for example, due to manufacturing inefficiencies, scaling issues, controller and/or readout limitations, and potential malfunctioning problems. This size limit may limit a size of a relief print object that can be scanned by a relief print scanner/reader. In order to alleviate this problem, as one example, two or more sensor arrays may be combined (e.g., operably coupled) to form a larger, combination sensor array. In this example, the combination sensor array may be able to capture a relief print from a larger portion of a relief print object. For example, respective fingers (e.g., ten fingers) of a person's hands may be scanned at a same time for fingerprints, and the resulting images from respective sensor arrays may be stitched together to form a combined image of the fingerprints and/or handprint(s).

Figure 3:
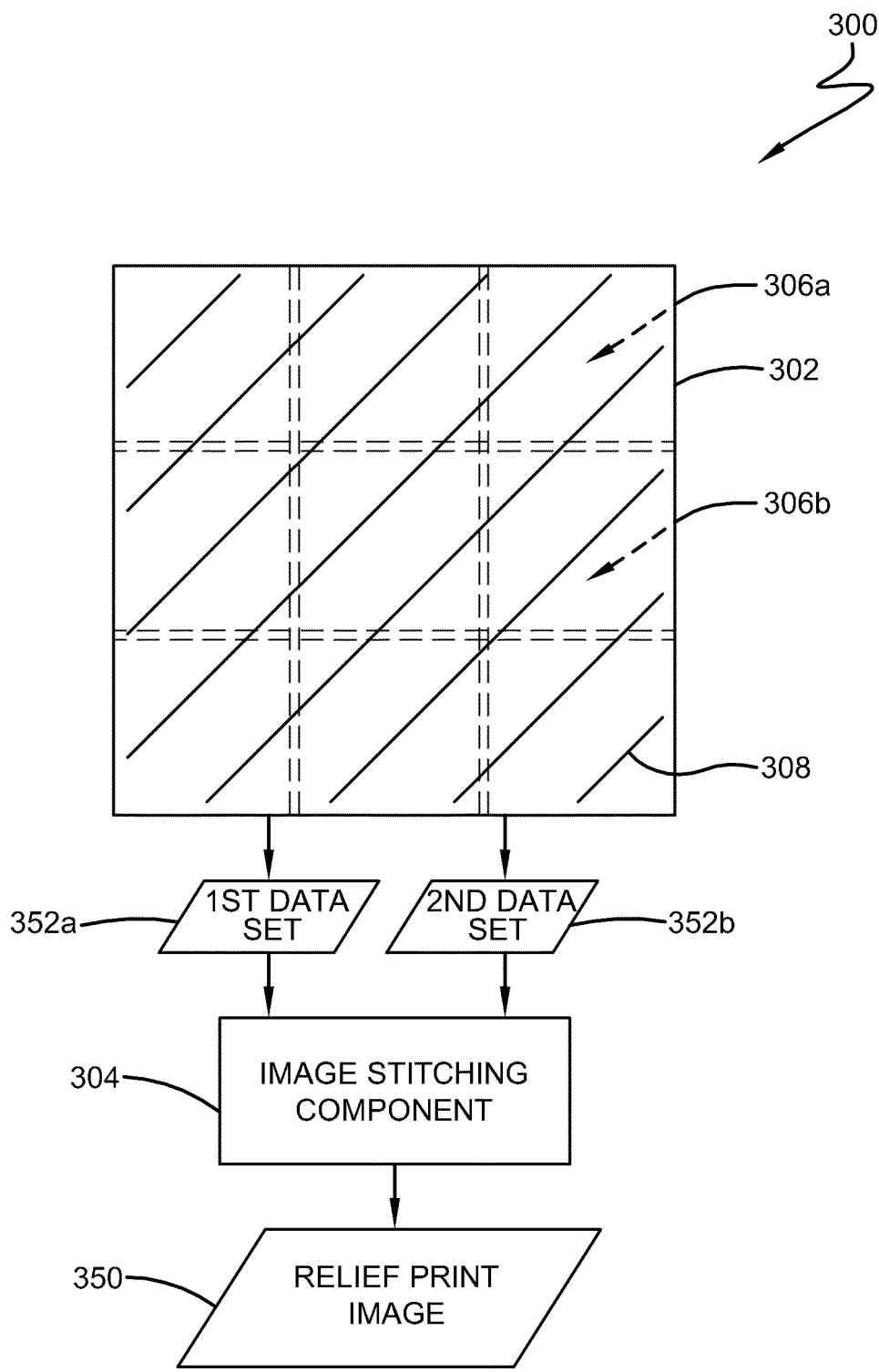
FIG. 3 is a component diagram illustrating an exemplary apparatus for producing a relief print image.

FIG. 3 is a component diagram illustrating an exemplary system 300 for producing a relief print image. In FIG. 3, the exemplary system 300 comprises a relief print data generation component 302 that is configured to generate a first set of relief print data 352a and a second set of relief print data 352b. The first set of relief print data 352a comprises a first indication of light from an electroluminescent layer 308 (e.g., 200 of FIG. 2A) received by a first sensor array 306a (e.g., 250 of FIG. 2B); the second set of relief print data 352b comprise a second indication of light from the electroluminescent layer 308 received by a second sensor array 306b. The relief print data generation component 302 comprises the first sensor array 306a, which is operably coupled with the second sensor array 306b, and the electroluminescent layer 308, which is disposed over a combination of the first sensor array 306a and the second sensor array 306b.

The exemplary system 300 further comprises an image stitching component 304, which is operably coupled with the relief print data generation component 302. The image stitching component 304 is configured to stitch together the first set relief print data 352a and the second set relief print data 352b, resulting in a third set of data indicative of a relief print image 350. In this way, for example, a plurality of sensor arrays may be combined to form a larger relief print capture area, such that a larger relief print may be captured (e.g., to read one or more handprints, and/or fingerprints at a same time). As another example, the larger relief print capture area may enable rolls scans to be performed (e.g., rolling one or more fingers from one side to the other over the scanning area), such that a more complete relief print (e.g., comprising a larger portion of the fingerprint) image may be captured. The respective images captured by the corresponding sensor array may be stitched together to form a large relief print image.

As one example, an image stitching process may be performed by the image stitching component 304 by combining multiple images, respectively comprising adjacent and/or overlapping fields of view, to produce a combined, segmented image (e.g., a panorama or high-resolution image). In one implementation of a stitching process, common features of the adjacent or overlapping views can be identified, and a direct alignment of the views may be determined that results in a desired sum of absolute differences (e.g., a smallest sum) between adjacent and/or overlapping pixels in the views. Further, in one implementation of stitching, respective adjacent views may be standardized (e.g., calibrated), such that respective views comprise relatively similar features and characteristics. Additionally, in one implementation of stitching, the views may be blended together at a border and/or overlap portion of the adjacent views, using a variety of image blending techniques (e.g., deghosting, motion compensation, high dynamic range merging, seam line adjustment, etc.).

Figure 4A:
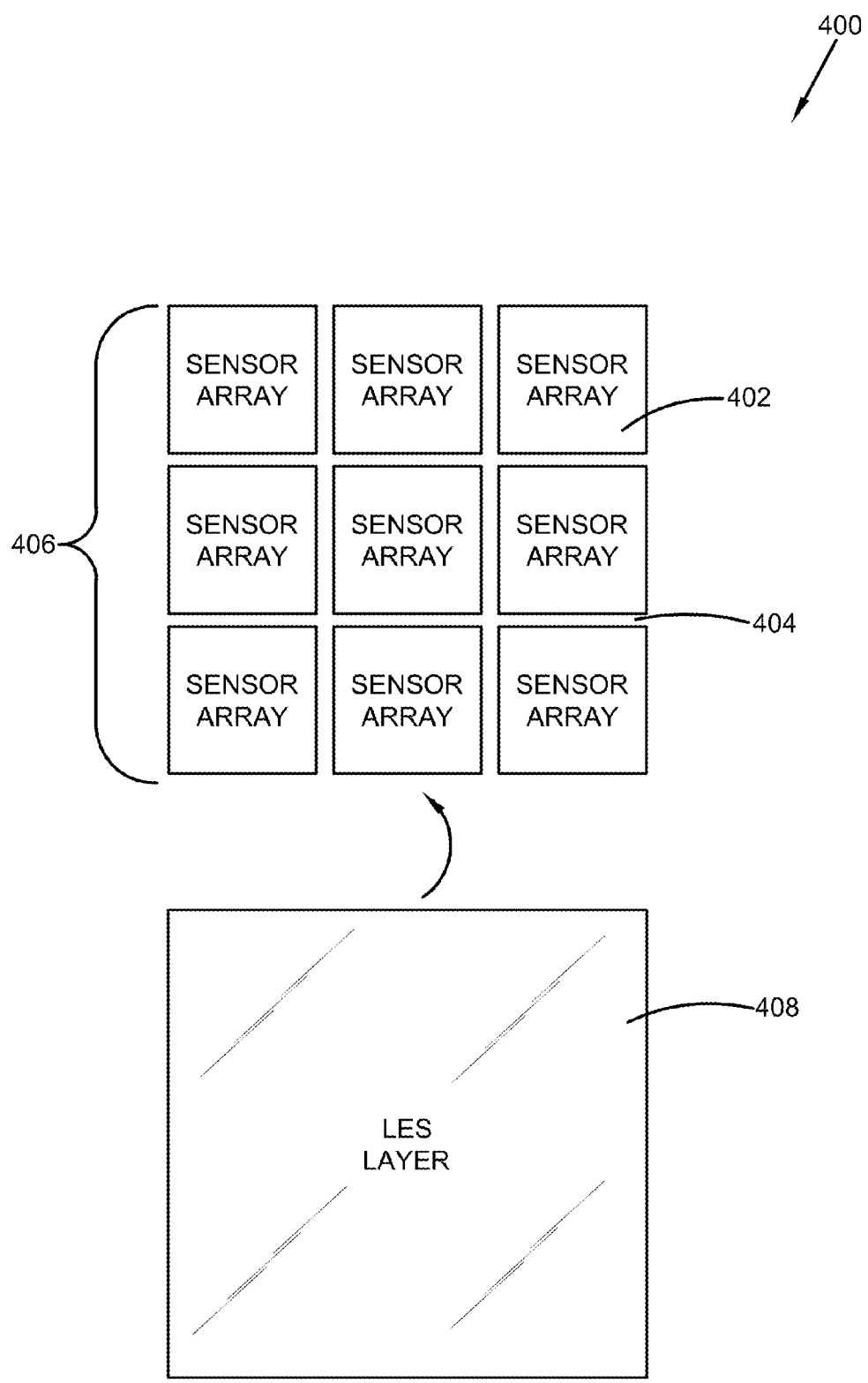
FIGS. 4A and 4B are component diagrams illustrating example implementations where one or more portions of systems described herein may be implemented.
Figure 4B:
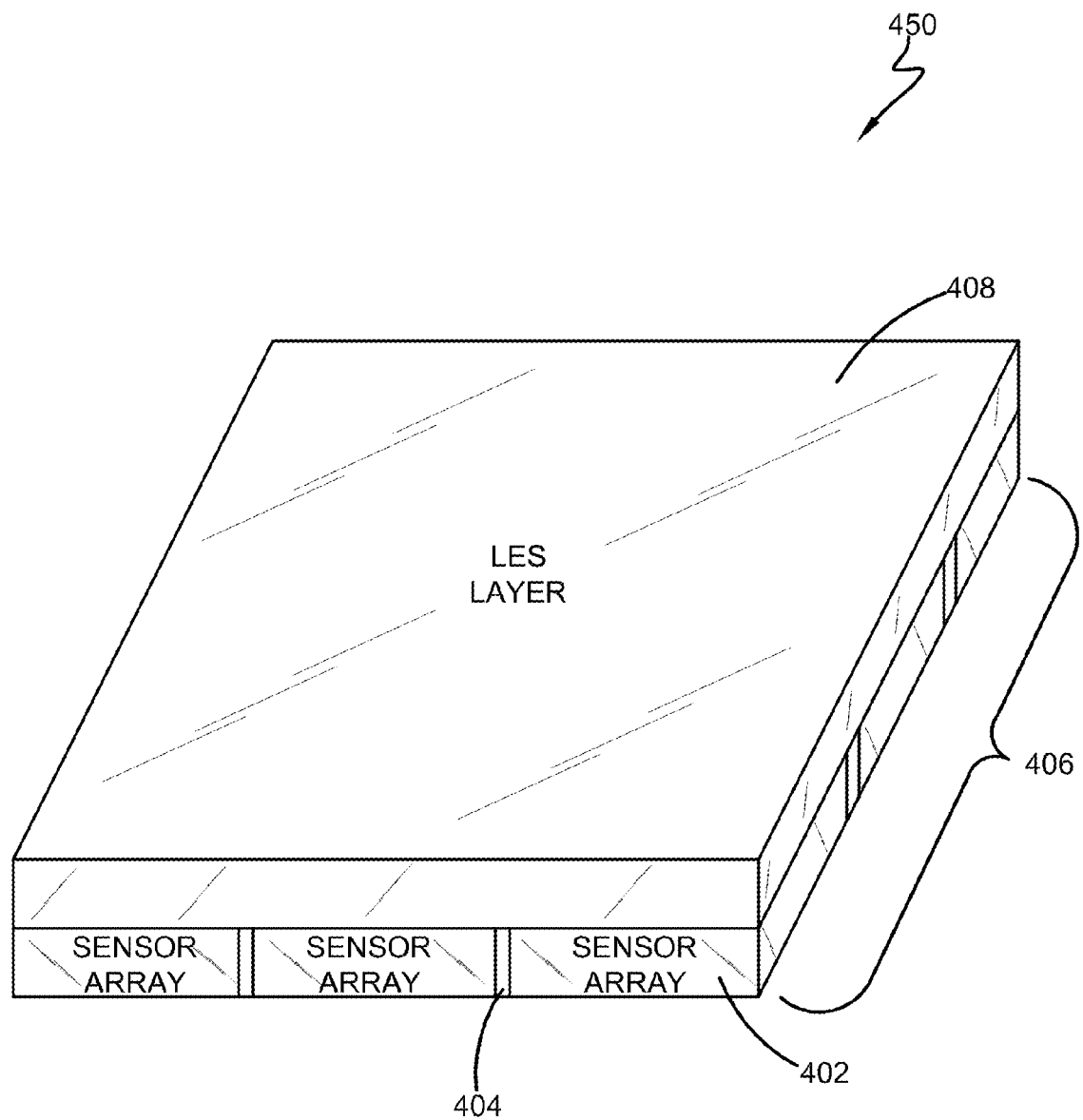

FIGS. 4A and 4B are component diagrams illustrating example implementations 400, 450 where one or more portions of systems described herein may be implemented. In the example implementations 400, 450, a plurality of sensor arrays 402 (e.g., comprising 250 of FIG. 2B) can be combined to form a combined sensor array layer 406. In one implementation, two or more light sensor arrays 402 can be joined together (e.g., as pairs, quadrants, etc.), such as at a seam 404, to create the sensor array layer 406, for example, for detecting light. For example, there may be a limit on a size of monolithic production (e.g., of a single sensor array), due to manufacturing inefficiencies, product problems, and/or output reading limitations, which may be overcome by a process of joining (e.g., at the seam 404) two or more independent arrays (e.g., 402) into one larger, combined sensor array layer (e.g., 406).

As one example, the respective sensor arrays 402 may comprise a suitable light sensing component, such as a thin film sensor (e.g., comprising a phototransistor and/or photodiode), charged coupled device (CCD), complementary metal-oxide semiconductor (CMOS), or some other sensor configured to convert received photons into an electrical signal indicative of the received light. In this example, a first side of a first sensor array may be joined to a second side of a second sensor array (e.g., left side of first sensor array joined to right side of second sensor array) by gluing, soldering, glazing, and/or by welding. As an example, the joining process may utilize an adhesive comprising metal, ceramic, a metal-filled glazing, polymer adhesive, UV-cured bonding agent, and/or solder that adheres the substrate of the first sensor array with the substrate of the second sensor array, forming a seam (e.g., 404) between the arrays.

In the example implementations 400, 450, an electroluminescent layer 408, such as a light emitting sensor layer (e.g., comprising 200 of FIG. 2A), may be disposed on top of (over) the combined sensor array layer 406. As described above, the electroluminescent layer 408 can be configured to emit photons from locations where a relief print object contacts the electroluminescent layer 408. That is, for example, friction ridges (e.g., fingerprints) comprised on a finger can contact the surface of the electroluminescent layer 408, while the valley portions of the relief prints may not. In this example, the electroluminescent layer may merely emit photons at those locations where the friction ridges contact the surface, thereby emitting light in the form of the relief print.

Further, for example, the photons emitted by the electroluminescent layer 408 may be received by the two or more combined sensor arrays 402 in the combined sensor array layer 406 disposed beneath the electroluminescent layer 408. In this way, for example, the respective sensor arrays 402 can detect light for a portion of the relief print that has contacted the surface of the electroluminescent layer 408 immediately above. Additionally, the respective sets of image data created by the sensor arrays 402 can be stitched together to generate a combined image comprising the entire portion of the relief print object that contacted the surface of the electroluminescent layer 408, for example.

In one implementation, the first set of relief print data, comprising a first indication of light from the electroluminescent layer received by the first sensor array, may come from a first portion of the relief object (e.g., a first finger of a hand), and the second set of relief print data, comprising a second indication of light from the electroluminescent layer received by the second sensor array, may come from a second portion of the relief object (e.g., a second finger of the hand). In one implementation, the first set of relief print data may come from a portion of a first relief object (e.g., a part of a first hand), and the second set of relief print data may come from a portion of a second relief object (e.g., a part of a second hand).

In one implementation, one or more of the sensor arrays may be configured to be selectively removable from the relief print data generation component. Further, in one implementation, the relief print data generation component may be configured to receive a replacement sensor array, as a replacement for a removed sensor array, where the replacement sensor array can perform the same functions as the removed sensor array. As an example, in FIG. 4B, the sensor array 402 may be selectively removed from the sensor array layer 406, and replaced with another, similar sensor array. For example, one of the sensor arrays may become damaged, and can be replaced with an undamaged sensor array.

In one implementation, one or more of the sensor arrays in the sensor array layer may be configured to be selectively activated and/or deactivated. As one example, where merely a portion of a relief print scanner is to be utilized (e.g., for one or two finger, as opposed to all five finger of a hand), those sensors corresponding to the used portion may be activated, while the remaining sensors are deactivated. In this example, various sensor arrays may be activated and/or deactivated to suit a particular use and/or image capture event.

Figure 5:
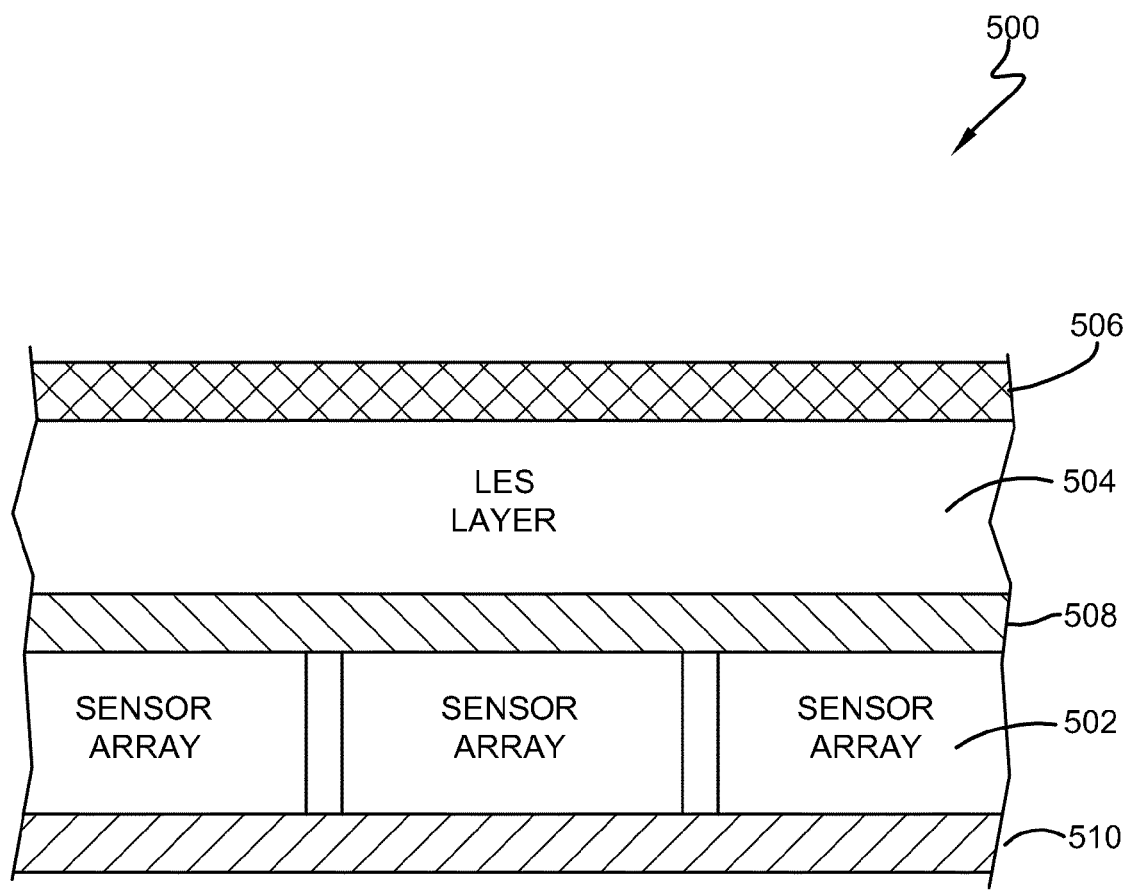
FIG. 5 is a component diagram illustrating an example implementation where one or more portions of systems described herein may be implemented.

FIG. 5 is a component diagram illustrating an example implementation 400 where one or more portions of systems described herein may be implemented. In one implementation, a sensor array (e.g., or portion thereof, such as a TFT) and/or the sensor array layer 502 may be disposed on an array substrate layer 510. As one example, the array substrate 510 may comprise a suitable substrate material, such as glass, quartz, amorphous silicon, and/or a suitable polymer (e.g., a thermoplastic polymer, such as polyethylene terephthalate), resin, or coating mixture/compound, configured to provide a suitable substrate the sensor array (e.g., or a combination of two or more materials). Further, in one implementation, respective sensor arrays and/or the array layer 502 may be formed on the array substrate layer 510, for example, such that the sensor arrays and/or the array layer 502 are adequately adhered to the substrate layer 510.

In one implementation, the array substrate layer 510 may comprise a substrate that can be shaped to a complimentary relief object shape (e.g., a complimentary shape to receive a finger and/or hand). As one example, the relief print data generation component, comprising the combined sensor arrays and the electroluminescent layer (e.g., and substrate) may be formed into a shape that allows for improved seating of a relief object. That is, for example, the relief print data generation component may comprise a hand or finger impression to seat the hand or finger properly; a curved shape (e.g., dome) to receive two hands in a more normal holding position; and/or other shapes that are complementary to the relief object.

In one implementation, the electroluminescent layer 504 may be disposed on an LES substrate layer 508. In one implementation, the LES substrate layer 508 can comprise a thin film type transparent substrate, for example, comprising thin film glass, quartz, amorphous silicon, and/or a suitable polymer suitable to comprise a substrate. In one implementation, the LES substrate layer 508 can comprise an adherence layer (e.g., an adhesive), configured to adhere the electroluminescent layer 504 (e.g., and/or the thin film type transparent substrate) to the combined sensor array layer 502. As an example, the adherence layer can comprise a transparent adhesive (e.g., comprising a mixture of epoxy adhesive (Araldite), polyvinyl butyral paste, ethylene glycol monoethyl ether acetate, n-butyl glycidyl ether, defoamer, and retardant).

In one implementation, the LES substrate layer 508 may comprise one or more a polarizing layers, which can be positioned between the electroluminescent layer 504 and the sensor array layer 502. As one example, a polarizing layer can be configured to pass vertical incident light (e.g., and absorbs other light) from the electroluminescent layer 504 to the sensor array layer 502. In this way, for example, the light that reaches the sensor array layer 502 may be less scattered than light not passing through the polarizing layer.

In one implementation, the LES substrate layer 508 may comprise one or more light shielding pattern layers, which can be positioned between the electroluminescent layer 504 and the sensor array layer 502 (e.g., instead of the polarizing layer). As one example, the light shielding pattern layer can comprise an opaque (e.g., black) film pattern formed around a shape of a sensor in the sensor array layer 502. For example, the light shielding pattern layer can comprise a plurality of openings that merely allow incident light that is relatively perpendicular to a plane of the electroluminescent layer 504 to pass to the sensor below.

In one implementation, the LES substrate layer 508 can comprise one or more of the above described layers (e.g., thin film type transparent substrate, adherence layer, one or more polarizing layers, and/or one or more light shielding pattern layers), in one or more combinations and/or arrangements. In one implementation, as described above, the LES substrate layer 508 may comprise a substrate that can be shaped to a complimentary relief object shape.

In one implementation, a cover layer 506 may be disposed on top of (e.g., and in contact with) the electroluminescent layer 504. As one example, the cover layer 506 may comprise a light shielding layer that can be disposed over the electroluminescent layer 504. For example, a light shielding layer may be configured to mitigate passage of photons generated by the electroluminescent layer 504. That is, for example, the light shielding layer can be comprised of material that causes photons emitted from the electroluminescent layer 504 to be reflected (e.g., and/or absorbed) back toward the sensor array layer 502.

As another example, the cover layer 506 may comprise a protective layer that may be disposed over the electroluminescent layer 504. For example, the protective layer may be configured to protect the electroluminescent layer 504 (e.g., and/or other layers disposed beneath) from potential abrasions, shock, and/or water damage. As an example, the protective layer may be comprised of a suitable material, such as glass, polymer and/or a resin (e.g., a thermosetting resin, such as a melamine resin). In one implementation, the cover layer 506 can comprise one or more of the above described layers (e.g., light shielding layer and/or the protective layer), in one or more combinations and/or arrangements.

Figure 6:
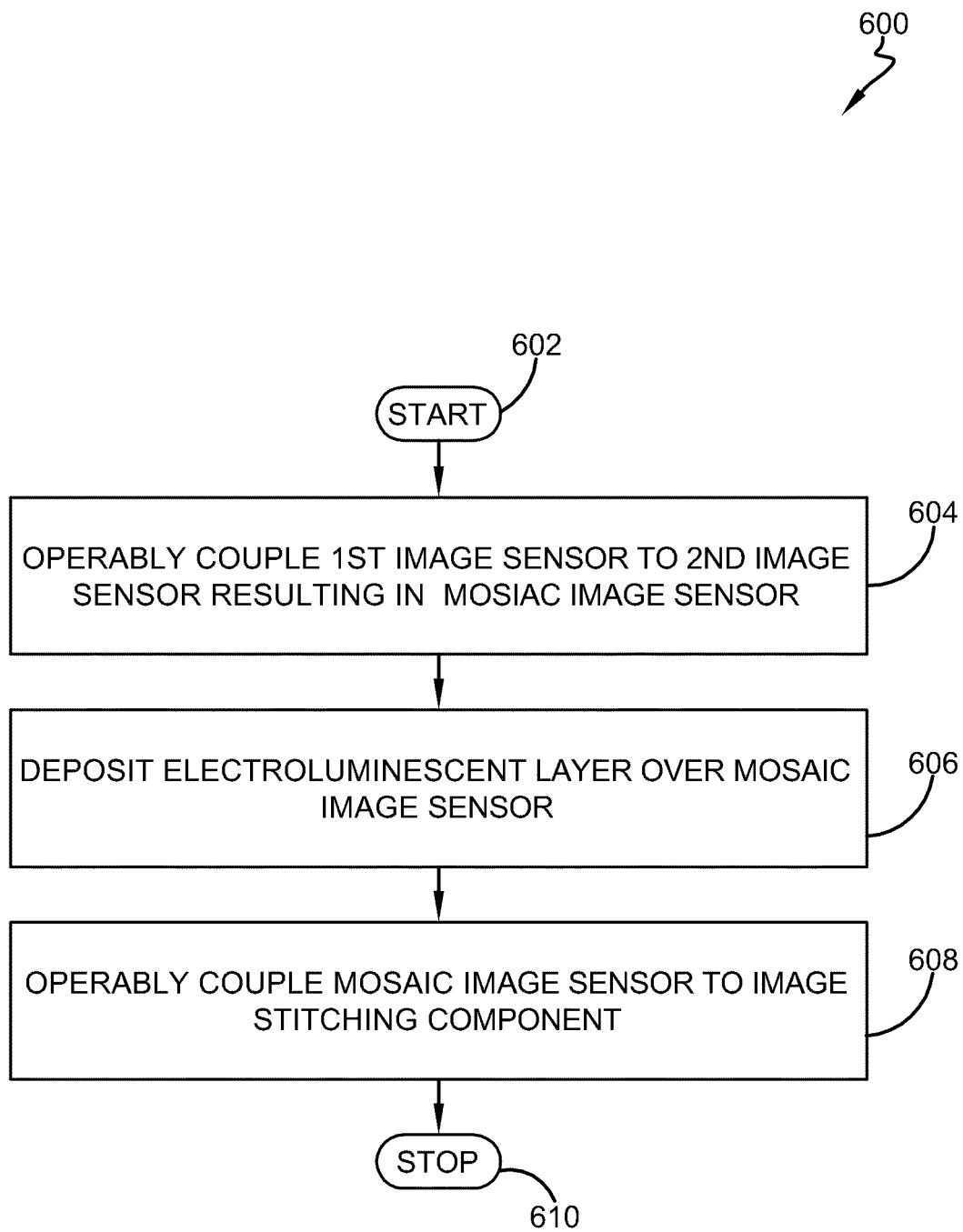
FIG. 6 is a flow diagram illustrating an exemplary method for manufacturing a system for producing a relief print image.

FIG. 6 is a flow diagram illustrating an exemplary method 600 for manufacturing a system for producing a relief print image. The exemplary method 600 begins at 602. At 604, a first image sensor is operably coupled with a second image sensor, resulting in a mosaic image sensor. Here, the mosaic image sensor is configured to generate a first set of relief print data and a second set of relief print data. The first set comprises a first indication of light from an electroluminescent layer that is received by the first image sensor. The second set comprises a second indication of light from the electroluminescent layer received by the second image sensor.

At 606, the electroluminescent layer is deposited on/over the mosaic image sensor. Here, the electroluminescent layer is configured to emit photons toward said mosaic image sensor. At 608, the mosaic image sensor is operably coupled to an image stitching component. The image stitching component is configured to stitch together said first set and said second set, producing a third set of data that is indicative of a relief print image. Having coupled the mosaic image sensor to the image stitching component, the exemplary method 600 ends at 610.

Figure 7:
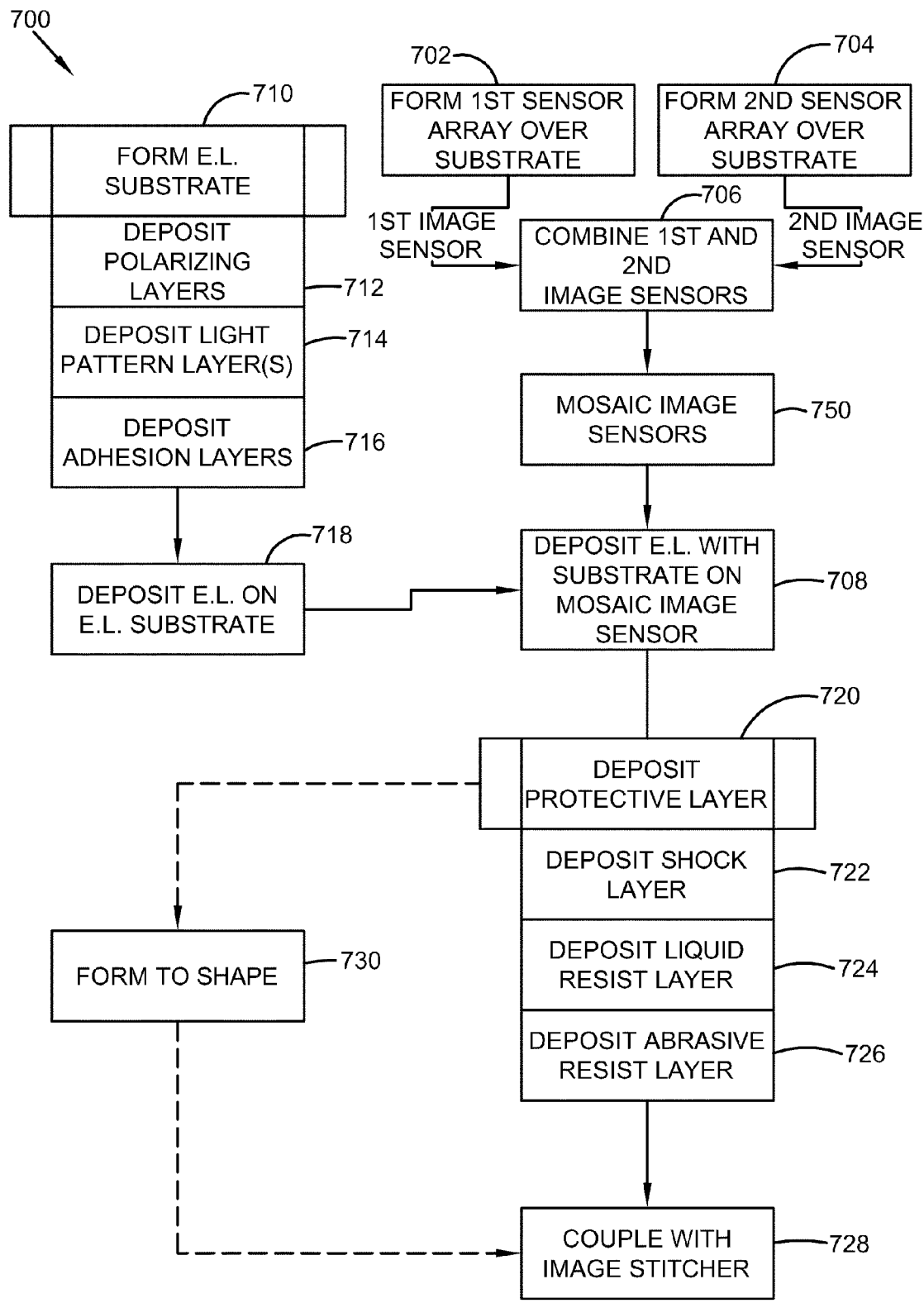
FIG. 7 is a flow diagram illustrating an example implementation where one or more portions of one or more techniques described herein may be implemented.

FIG. 7 is a flow diagram illustrating an example implementation where one or more portions of one or more techniques described herein may be implemented. At 702, a first sensor array can be formed over a first sensor array substrate, creating the first image sensor, and a second sensor array can be formed over a second sensor array substrate, creating the second image sensor, at 704. As one example, a thin-film photo-sensitive sensor array can be formed over a suitable substrate material, such as glass, quartz, amorphous silicon, and/or a suitable polymer (e.g., a thermoplastic polymer, such as polyethylene terephthalate), resin, or coating mixture/compound, configured to provide a suitable substrate the sensor array (e.g., or a combination of two or more materials).

At 710, an electroluminescent layer substrate may be formed. Forming an electroluminescent layer can comprise depositing one or more polarizing layers, at 712, depositing one or more light pattern layers, at 714, and/or depositing one or more adhesion layers (e.g., between other layers), at 716. As one example, the electroluminescent layer substrate can comprise a thin film type transparent substrate, comprising thin film glass, quartz, amorphous silicon, and/or a suitable polymer suitable to comprise a substrate.

Further, for example, the electroluminescent layer substrate may comprise one or more a polarizing layers, which can be positioned between the electroluminescent layer and one or more of the sensor arrays. The polarizing layer(s) can be configured to pass vertical incident light from the electroluminescent layer to one or more of the sensor arrays. Additionally, the electroluminescent layer substrate may comprise one or more light shielding pattern layers, which may comprise a plurality of openings that merely allow incident light that is relatively perpendicular to a plane of the electroluminescent layer to pass to a sensor below.

At 718 in the example implementation 700, the electroluminescent layer may be deposited on the electroluminescent layer substrate (e.g., using an adherence layer). At 708, the combined electroluminescent layer and electroluminescent layer substrate can be deposited on the mosaic image sensor 750.

At 720, a protective layer may be deposited over the electroluminescent layer. Depositing the protective layer can comprise depositing a shock resistance layer, at 722, depositing a liquid resistance layer, at 724, and/or an abrasion resistance layer, at 726. In one implementation, the protective layer can be configured to protect the electroluminescent layer (e.g., and/or other layers disposed beneath) from potential abrasions, shock, and/or water damage. As an example, the protective layer may be comprised of a suitable material, such as glass, polymer and/or a resin (e.g., a thermosetting resin, such as a melamine resin). In one implementation, the protective layer can comprise one or more of the above described layers in one or more combinations and/or arrangements.

In one implementation, at 730, the combined mosaic image sensor and electroluminescent layer (e.g., and other layers and/or substrates) may be formed/shaped into a complimentary relief object shape. As one example, the electroluminescent layer substrate and/or the sensor array substrate may comprise materials that may be shaped to a desired configuration. For example, a finger and/or hand receiving shape may be formed, that is complementary to the finger and or hand (e.g., shaped as a receiving impression). As another example, the combined mosaic image sensor and electroluminescent layer may be formed over a dome shape that can readily accommodate receiving two hands for relief print imaging.

At 728 in the example implementation 700, the mosaic image sensor can be operably coupled with the image stitching component. The image stitching component can be configured to stitch together sets of images (e.g., from respective coupled sensor arrays), creating a set of data that comprises a relief print image. As an example, a hand placed on a surface of a hand print scanner may be imaged using a plurality of coupled sensors, respectively capturing an image of a portion of the hand. The resulting images can be combined by the image stitching component, for example, resulting in a combined image comprising merely a relief print of the hand.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used in this application, the terms "component," "module," "system," "interface," and the like to can be used to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for producing a relief print image, comprising:
    a relief print data generation component configured to generate a first set of relief print data and a second set of relief print data, said first set comprising a first indication of light from an electroluminescent layer received by a first sensor array, said second set comprising a second indication of light from said electroluminescent layer received by a second sensor array at substantially a same time as the first set is received by the first sensor array, said relief print data generation component comprising:
        said first sensor array, configured to convert received photons to an electrical signal, operably coupled with said second sensor array, configured to convert received photons to an electrical signal; and
        said electroluminescent layer disposed over a combination of said first sensor array and said second sensor array; and
    an image stitching component, operably coupled with said relief print data generation component, configured to stitch together said first set and said second set, resulting in a third set of relief print data indicative of a relief print image.

2. The system of claim 1, wherein said first set comprises relief print data from a first portion of a relief object and said second set comprising relief print data from a second portion of a relief object.

3. The system of claim 1, wherein said first set comprises relief print data from at least a portion of a first relief object and said second set comprising relief print data from at least a portion of a second relief object.

4. The system of claim 1, wherein said relief print data generation component further comprises a plurality of sensor arrays, wherein:
    respective sensor arrays are operably coupled to at least one other sensor array and configured to convert received photons to an electrical signal; and
    said image stitching component is configured to stitch together relief print image data generated from respective sensor arrays, resulting in said third set of relief print data indicative of said relief print image.

5. The system of claim 1, wherein said first sensor array and said second sensor array comprises one or more of:
    a photo-sensitive thin film transistor (TFT);
    a thin film photo-diode;
    a complementary metal-oxide semiconductor (CMOS) image sensor; and
    a charge-coupled device (CCD) image sensor.

6. The system of claim 1, wherein said relief print data generation component comprises a sensor array substrate adhered under one or more of:
    said first sensor array;

said second sensor array; and
said combination of said first sensor array and said second sensor array.

7. The system of claim 5, wherein said sensor array substrate is configured to be shaped to a complimentary relief object shape.

8. The system of claim 6, wherein said relief print data generation is disposed in said complimentary relief object shape.

9. The system of claim 8, wherein said relief print data generation component is further configured to receive a third sensor array as a replacement for a removed sensor array, said third sensor array configured to perform a same function as said removed sensor array.

10. The system of claim 1, wherein one or more of said first sensor array and said second sensor array are further configured to be selectively removable from said relief print data generation component.

11. The system of claim 1, wherein one or more of said first sensor array and said second sensor array are further configured to be one or more of:
selectively activated; and
selectively deactivated.

12. The system of claim 11, wherein said electroluminescent layer substrate comprises one or more of:
one or more polarizing layers;
one or more light shielding pattern layers configured to direct incident light in a desired pattern toward one or more of said first sensor array and said second sensor array; and
one or more adherence layers configured to adhere a first layer to a second layer.

13. The system of claim 1, wherein said relief print data generation component further comprises said electroluminescent layer disposed over an electroluminescent layer substrate, said electroluminescent layer substrate disposed over said combination of said first sensor array and said second sensor array.

14. The system of claim 1, wherein said relief print data generation component further comprises a protective layer disposed over said electroluminescent layer, said protective layer comprising one or more of:
an abrasion resistive layer;
a liquid resistive layer; and
a shock resistive layer.

15. A method for manufacturing a system for producing a relief print image, comprising:
operably coupling a first image sensor and a second image sensor, resulting in a mosaic image sensor configured to generate a first set of relief print data and a second set of relief print data, said first set comprising a first indication of light from an electroluminescent layer received by said first image sensor, said second set comprising a second indication of light from said electroluminescent layer received by said second image sensor at substantially a same time as the first set is received by the first image sensor;
depositing said electroluminescent layer over said mosaic image sensor, said electroluminescent layer configured to emit photons toward said mosaic image sensor; and
operably coupling said mosaic image sensor to an image stitching component configured to stitch together said first set and said second set, resulting in a third set of data indicative of a relief print image.

16. The method of claim 15, further comprising one or more of:
forming a first sensor array over a first sensor array substrate, resulting in said first image sensor; and
forming a second sensor array over a second sensor array substrate, resulting in said second image sensor.

17. The method of claim 15, further comprising depositing said electroluminescent layer on an electroluminescent layer substrate disposed over said mosaic image sensor, said electroluminescent layer substrate comprising one or more of:
one or more polarizing layers;
one or more light shielding pattern layers configured to direct incident light in a desired pattern toward one or more of said first sensor array and said second sensor array; and
one or more adherence layers configured to adhere a first layer to a second layer.

18. The method of claim 15, further comprising depositing a protective layer disposed over said electroluminescent layer, said protective layer comprising one or more of:
an abrasion resistive layer;
a liquid resistive layer; and
a shock resistive layer.

19. The method of claim 15, further comprising forming combined said mosaic image sensor and electroluminescent layer in a complimentary relief object shape.

20. An apparatus for producing a relief print image, comprising:
a relief print data generation component configured to generate a first set of relief print data and a second set of relief print data, said first set comprising a first indication of light from an electroluminescent layer received by a first sensor array, said second set comprising a second indication of light from said electroluminescent layer received by a second sensor array at substantially a same time as the first set is received by the first sensor array, said relief print data generation component comprising:
said first sensor array, configured to convert received photons to an electrical signal, comprising a first thin-film photosensitive sensor array formed over a first sensor array substrate;
said second sensor array, operably coupled with said first sensor array, configured to convert received photons to an electrical signal, comprising a second thin-film photosensitive sensor array formed over a first sensor array substrate; and
said electroluminescent layer disposed over an electroluminescent layer substrate, said electroluminescent layer substrate disposed over a combination of said first sensor array and said second sensor array;
a protective layer disposed over said electroluminescent layer; and
an image stitching component, operably coupled with said relief print data generation component, configured to stitch together said first set and said second set, resulting in a third set of data indicative of a relief print image.

* * * * *